(12) United States Patent
Fattal

(10) Patent No.: US 8,437,158 B2
(45) Date of Patent: May 7, 2013

(54) ACTIVE RECTIFICATION OUTPUT CAPACITORS BALANCING ALGORITHM

(75) Inventor: Souren G. Fattal, Palatine, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 56 days.

(21) Appl. No.: 13/079,925

(22) Filed: Apr. 5, 2011

(65) Prior Publication Data

US 2012/0257427 A1 Oct. 11, 2012

(51) Int. Cl.
*H02M 3/24* (2006.01)
*H02M 7/217* (2006.01)

(52) U.S. Cl.
USPC .................................... 363/89; 363/127

(58) Field of Classification Search ............. 363/84, 363/89, 125, 127
See application file for complete search history.

(56) References Cited

U.S. PATENT DOCUMENTS

| | | | | |
|---|---|---|---|---|
| 5,886,891 A | * | 3/1999 | Jiang et al. | 363/84 |
| 6,038,152 A | * | 3/2000 | Baker | 363/89 |
| 6,122,183 A | * | 9/2000 | He et al. | 363/44 |
| 7,336,513 B1 | * | 2/2008 | Chen et al. | 363/98 |
| 7,518,895 B2 | * | 4/2009 | Shekhawat et al. | 363/89 |
| 2009/0040800 A1 | * | 2/2009 | Sonnaillon et al. | 363/89 |
| 2009/0122582 A1 | * | 5/2009 | Ye et al. | 363/89 |

* cited by examiner

*Primary Examiner* — Matthew Nguyen
(74) *Attorney, Agent, or Firm* — Kinney & Lange, P.A.

(57) ABSTRACT

An active rectification system includes an active rectifier that converts an alternating current (AC) input to a direct current (DC) output. The active rectifier includes a plurality of switching devices and at least a first output capacitor and a second output capacitor connected at the DC output of the active rectifier. A controller includes a DC output regulation portion and an output capacitor balancing portion, wherein the DC output regulation portion monitors the DC output and in response generates control signals for regulating the DC output to a desired value. The output capacitor balancing portion monitors first and second output capacitor voltages associated with the first and second output capacitors, respectively, and generates an accumulated adjustment value that modifies the control signals provided by the DC output regulation portion to balance the first and second output capacitor voltages.

18 Claims, 3 Drawing Sheets

ACTIVE RECTIFICATION OUTPUT CAPACITORS BALANCING ALGORITHM

BACKGROUND

The present invention relates generally to active rectifiers, and in particular to control schemes for active rectifiers.

In aircraft, weight restrictions play important roles in the design and operation of power systems. Active rectifiers, which replace passive diode components with actively controlled switching elements (such as MOSFETs) provide improved efficiency and power factor correction, thereby reducing the overall weight of the rectification system. Various active rectifier topologies and control schemes have been designed to further improve the efficiency and power factor correction provided by active rectification.

SUMMARY

An active rectification system includes an active rectifier that converts an alternating current (AC) input to a direct current (DC) output. The active rectifier includes a plurality of switching devices and at least a first output capacitor and a second output capacitor connected at the DC output of the active rectifier. The system further includes a controller having a DC output regulation portion and an output capacitor balancing portion. The DC output regulation portion monitors the DC output and in response generates control signals for regulating the DC output to a desired value. The output capacitor balancing portion monitors first and second output capacitor voltages associated with the first and second output capacitors, respectively, and generates an accumulated adjustment value that modifies the control signals provided by the DC output regulation portion to balance the first and second output capacitor voltages.

DETAILED DESCRIPTION

A multi-level active rectifier converts an alternating current (AC) input to a direct current (DC) output and includes at least first and second output capacitors connected at the output of the active rectifier. A controller regulates the operation of the active rectifier, including regulating the DC output of the active rectifier to a desired value and balancing voltages provided across the first and second output capacitors.

Figure 1:
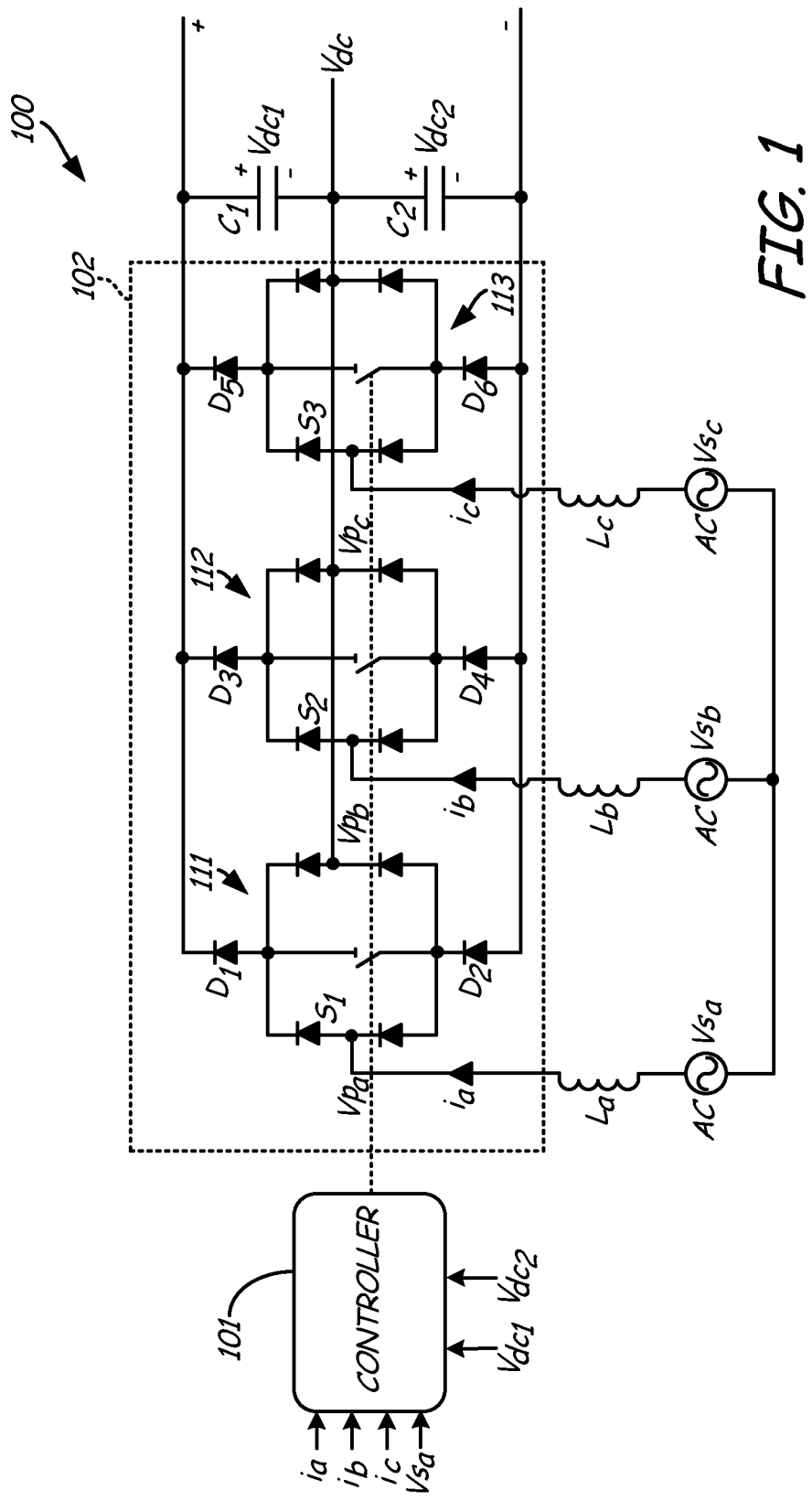
FIG. 1 is a circuit diagram of an active rectification system according to an embodiment of the present invention.

FIG. 1 is a circuit diagram of an active rectification system according to an embodiment of the present invention, where Vsa, Vsb, Vsc represent a source input three-phase voltage, and Vpa, Vpb, Vpc represent a three-phase pole voltage. An active rectifier 102, which includes a plurality of active switching devices S1, S2, S3, converts the input three-phase voltage Vsa, Vsb, Vsc to a DC output Vdc. A controller 101 may be a computer processor or processing apparatus configured and disposed to regulate the DC output Vdc to a desired value through selective control of the active switching devices $S_1$, $S_2$, $S_3$. In particular, controller 101 monitors the output capacitor voltages Vdc1, Vdc2 and acts to balance the voltage across both capacitors while maintaining a desired DC output voltage Vdc.

In the embodiment shown in FIG. 1, the active rectifier 102 is a three-phase three-level switching rectifier that may be realized using a VIENNA rectifier. However, it should be understood that example embodiments are not limited to the illustrated topology of the VIENNA rectifier 102 as any other VIENNA rectifier topology as well as any suitable multi-level active rectifier may be used according to any desired implementation.

The active rectifier 102 may include at least three switches $S_1$, $S_2$, and $S_3$. Each of the switches $S_1$, $S_2$, and $S_3$ is surrounded by balanced diode bridges 111, 112, and 113, respectfully. The first diode bridge 111 may be coupled between a first diode $D_1$ and a second diode $D_2$. The second diode bridge 112 may be coupled between a third diode $D_3$ and a fourth diode $D_4$. The third diode bridge may be coupled between a fifth diode $D_5$ and a sixth diode $D_6$. Further, each of the three switches $S_1$, $S_2$, and $S_3$ may be configured to switch between at least two states. The at least two states may include an open state, and a closed state. The open and closed states, as controlled using controller 101, realize three-level switching and active rectification using two level switches with two states.

The active rectifier 102 may further include a first capacitance $C_1$ coupled across each of the first, third, and fifth diodes $D_1$, $D_3$, and $D_5$, and a center point of each diode bridge 111, 112, and 113, respectfully. The active rectifier 102 may further include a second capacitance $C_2$ coupled across each of the second, fourth, and fifth diodes $D_2$, $D_4$, and $D_6$, and a center point of each diode bridge 111, 112, and 113, respectfully. Although not illustrated, the system 100 may include a load and/or load resistance $R_L$, coupled in parallel across both the first and second capacitances C1 and C2 of active rectifier 102. As further illustrated, the system 100 may further include boost inductors $L_a$, $L_b$, and $L_c$; each corresponding to a single phase of three-phase AC input current/power source ($Vs_a$, $Vs_b$, and $Vs_c$).

As illustrated, the controller 101 is in electrical communication with each of the switches $S_1$, $S_2$, and $S_3$. During operation, the controller 101 may direct each of the switches $S_1$, $S_2$, and $S_3$ to change between one of the open and closed states available to the switches $S_1$, $S_2$, and $S_3$, based upon a control scheme that regulates the DC output voltage Vdc to a desired value, and in addition balances the respective output capacitor voltages $Vdc_1$, $Vdc_2$ provided across capacitors C1 and C2, respectively.

Figure 2:
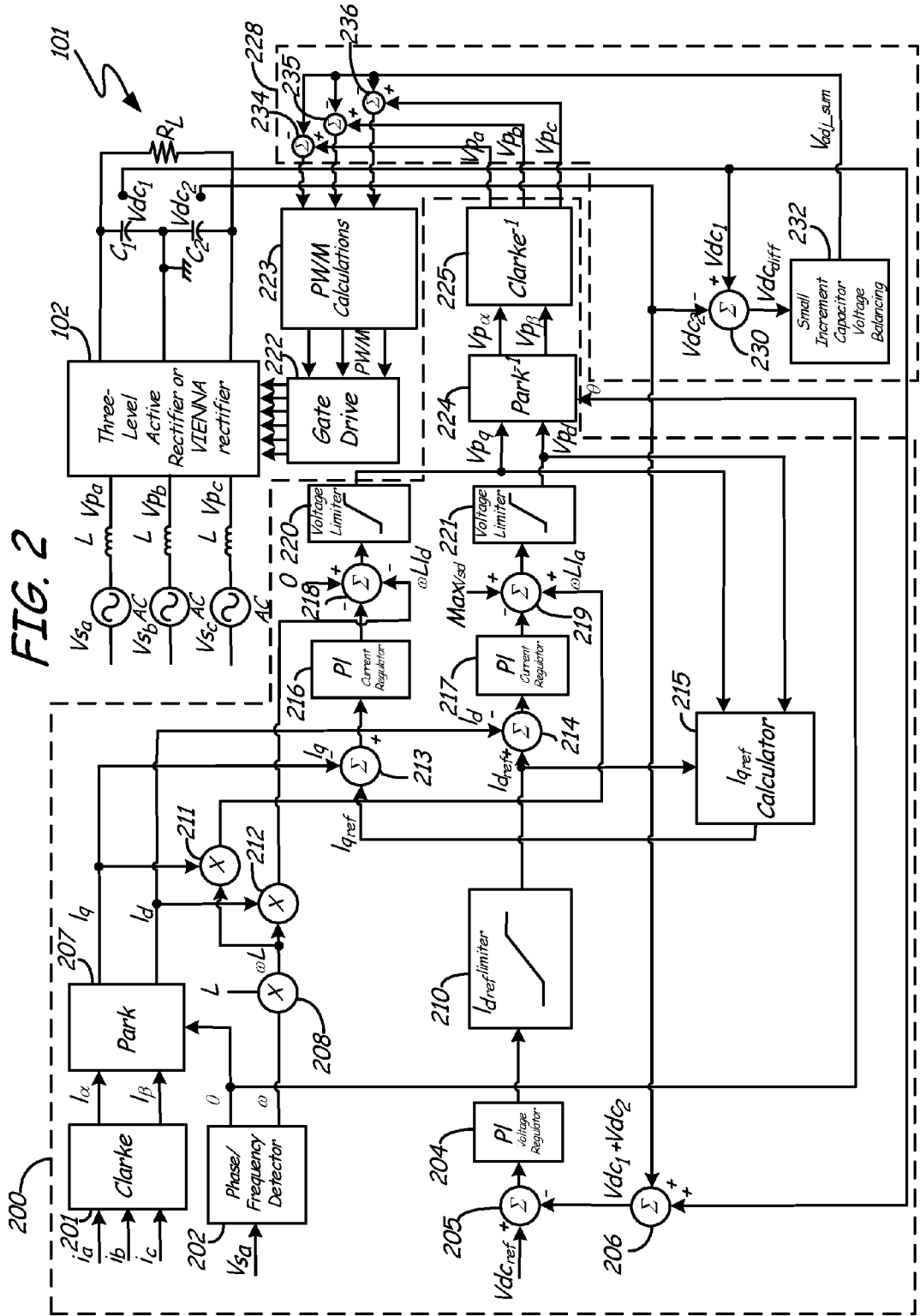
FIG. 2 is a block diagram illustrating a rectifier control algorithm according to an embodiment of the present invention.

FIG. 2 is a block diagram illustrating a rectifier control algorithm executed by controller 101 according to an embodiment of the present invention. The control methodology may be implemented as computer executable instructions that, when executed on any suitable processor, direct the processor to perform and execute the methodology as described below. The control methodology is divided, for purposes of this description, into a DC output regulation portion 200 responsible for generating control signals for regulating the DC output of the active rectifier 102 (shown in FIG. 1) and an output capacitor balancing portion 228 that modifies the control signals provided by the DC output regulation portion 200 to balance output capacitor voltages $Vdc_1$, $Vdc_2$ across capacitors C1 and C2, respectively. In the example shown in FIG. 2, the control signals provided by DC output regulation portion 200 are desired pole voltage values $Vp_a$, $Vp_b$, $Vp_c$, which are modified by an accumulated adjustment value Vadj_sum generated by the output capacitor balancing portion 228. In general, the control signals provided by DC output regulation portion 200 represent the control signals required to regulate the DC output Vdc to a desired value, while the accumulated adjustment value Vadj_sum represents the modification required to balance output capacitor voltages $Vdc_1$, $Vdc_2$.

In the control algorithm illustrated with respect to FIG. 2, the three phase current input $i_a$, $i_b$, $i_c$, voltage input $Vs_a$ as well as the two capacitor voltage outputs $Vdc_1$, $Vdc_2$ are continuously monitored by controller 101 (shown in FIG. 1). At block 206 the two output DC capacitor voltages $Vdc_1$, $Vdc_2$ are summed to provide a value representative of the DC output voltage Vdc. The resulting sum is subtracted from the desired output DC voltage $Vdc_{ref}$ at block 205. The resulting difference between the monitored DC output voltage Vdc and the desired DC output voltage $Vdc_{ref}$ is then processed through a proportional and integral control at block 204 and then limited at block 210. The output of block 210 is the d-component reference of the current.

Block 202 of FIG. 2 is the phase and frequency detector. Phase A of the input 3-phase voltage is used here to detect the phase angle and frequency of the input voltage. The outputs of block 202 are the phase angle θ and the angular frequency ω=2πf, where f is the detected frequency in Hz. In other embodiments, other methods of detecting the phase angle and frequency of the input voltage may be employed.

At block 201 the current three-phase inputs $i_a$, $i_b$, $i_c$ of active rectifier 102 are transformed using Clarke transformations. One example of a Clarke transformation is depicted in Equations 1 and 2, below. However, it should be noted that any suitable implementation including different equations may also be applicable.

$$i_\alpha = i_a \qquad \text{Equation 1}$$

$$i_\beta = \frac{1}{\sqrt{3}} i_a + \frac{2}{\sqrt{3}} i_b \qquad \text{Equation 2}$$

Subsequently, the outputs $i_\alpha$, $i_\beta$ of the Clarke transformations are input to block 207, where the Clarke outputs are transformed into a d-q frame through Park transformations using the detected phase angle θ. One example of a Park transformation is depicted in Equations 3 and 4, below. However, it should be noted that any suitable implementation including different equations may also be applicable.

$$i_d = \cos(\theta) \cdot i_\alpha + \sin(\theta) \cdot i_\beta \qquad \text{Equation 3}$$

$$i_q = -\sin(\theta) \cdot i_\alpha + \cos(\theta) \cdot i_\beta \qquad \text{Equation 4}$$

The angular frequency ω is multiplied by the single phase boost inductance L at block 208. The resulting ωL is then multiplied by the d-q components $i_d$, $i_q$ of the current at blocks 211 and 212. Thereafter, d-q current components $i_d$, $i_q$ of the measured current are subtracted from the d-q reference component $i_{dref}$, $i_{qref}$ of the current at blocks 213 and 214. Proportional and integral (PI) control of the difference outputs at blocks 213 and 214 is performed at blocks 216 and 217, respectively. One example of a suitable proportional Laplace transform for blocks 216 and 217 is depicted in Equation 5, below:

$$K_p + \frac{K_i}{s} \qquad \text{Equation 5}$$

In Equation 5, $K_p$ is proportional gain and $K_i$ is integral gain.

Block 218 subtracts the output of block 216 and the multiplication of ωL and $I_d$ performed at block 212 from zero (which is the expected q-component of the input voltage). Block 219 subtracts the output of block 217, adds the multiplication of ωL and $I_q$ performed at block 211, and adds the maximum expected value of the d-component of the input voltage ($Max_{Vsd}$). The outputs of blocks 218 and 219 are then limited using voltage limiters 220 and 221, respectively. The outputs of blocks 220 and 221 are the d-q components of the resulting pole voltage $Vp_q$, $Vp_d$. The d-q components of the resulting pole voltages $Vp_q$, $Vp_d$ are then transformed at blocks 224 and 225 using an inverse Park transformation, inverse Clark transformation, and the phase angle θ or a modified θ that includes delays due to hardware implementation artifacts of the control algorithm to the 3-phase components of the resulting pole voltage.

One example of an inverse Park transformation is depicted in Equations 6 and 7, below. However, it should be noted that any suitable implementation including different equations may also be applicable.

$$Vp_\alpha = \cos(\theta) \cdot Vp_d - \sin(\theta) \cdot Vp_q \qquad \text{Equation 6}$$

$$Vp_\beta = \sin(\theta) \cdot Vp_d + \cos(\theta) \cdot Vp_q \qquad \text{Equation 7}$$

One example of an inverse Clarke transformation is depicted in Equations 8, 9 and 10, below. However, it should be noted that any suitable implementation including different equations may also be applicable.

$$Vp_a = Vp_\alpha \qquad \text{Equation 8}$$

$$Vp_b = -\frac{1}{2} Vp_\alpha + \frac{\sqrt{3}}{2} Vp_\beta \qquad \text{Equation 9}$$

$$Vp_c = -\frac{1}{2} Vp_\alpha - \frac{\sqrt{3}}{2} Vp_\beta \qquad \text{Equation 10}$$

The d-q components of the resulting pole voltages $Vp_q$, $Vp_d$ (outputs of blocks 220 and 221) along with the calculated reference d-component of the current $i_{dref}$ (output of block 210) are used in block 215 to calculate the reference q-component of the current. Block 215 performs a phase alignment of the input current to the resulting pole voltage of the active rectifier. This is done by calculating the q-component current reference such that the input current and the pole voltage are in phase alignment. The calculated q-component current reference is to be used as a reference during the subsequent control loop processing (i.e., the following instance the control loop is processed). In some embodiments, the reference q-component $i_{qref}$ is set equal to zero in order to achieve a power factor of one. However, the reference q-component $i_{qref}$ may also be set or calculated to a desired value to achieve a desired result (e.g., calculating the reference q-component $i_{qref}$ to align the three-phase input voltage with the three-phase output voltage).

The pole voltages $Vp_a$, $Vp_b$, and $Vp_c$ provided as a result of the inverse Clarke transformation represent the pole voltages required to generate the desired DC output voltage, without concern for the capacitor voltage outputs Vdc1, Vdc2. An adjustment signal $V_{adj}$ is summed with the pole voltages $Vp_a$, $Vp_b$, and $Vp_c$ at blocks 234, 235 and 236, respectively, for provision to block 223 for calculation of pulse width modulation (PWM) signals. The PWM signal are provided to gate drive 222, which selectively controls the open/close state of the plurality of switches included within active rectifier 102. In this way, the control methodology provided with respect to FIG. 2, excluding output capacitor balancing portion 228, generates control signals (e.g., desired pole voltages $Vp_a$, $Vp_b$, $Vp_c$) for regulating the DC output voltage Vdc to a desired, fixed value. It should be understood that other well-known control algorithms may be employed to regulate the output voltage of an active rectifier, and may be used in conjunction with the output capacitor balancing portion 228.

The output capacitor balancing portion 228 generates an accumulated adjustment value that is provided to modify the control signals generated by DC output regulation portion 200 in order to balance the output capacitor voltages Vdc1, Vdc2. The output capacitor balancing portion 228 includes difference calculator block 230, small increment capacitor voltage balancing block 232, and difference blocks 234, 235 and 236. Output capacitor balancing portion 228 acts to balance the capacitor voltage outputs $Vdc_1$, $Vdc_2$ without affecting the sum of capacitor voltage outputs (i.e., DC output Vdc, which should remain equal to the desired DC output value). For purposes of this description, the first output capacitor C1 is charged by positive phase voltages, while the second output capacitor C2 is charged by negative phase voltages. Increasing the pole voltages has the effect of increasing the voltage on the first output capacitor C1 relative to the second output capacitor C2, while decreasing the pole voltages has the effect of increasing the voltage on the second output capacitor C2 relative to the first output capacitor C1. In other control algorithms, the opposite configuration may be true.

To balance the capacitor output voltages, a difference signal $Vdc_{diff}$ is calculated by subtracting the second capacitor output voltage $Vdc_2$ from the first capacitor output voltage $Vdc_1$ at difference calculator block 230. A non-zero value represents an imbalance in the capacitor output voltages $Vdc_1$, $Vdc_2$. The calculated difference signal $Vdc_{diff}$ is provided to small increment capacitor voltage balancing block 232, which calculates an accumulated adjustment value Vadj_sum to be subtracted from the pole voltages $Vp_a$, $Vp_b$, and $Vp_c$. In general, if the difference signal $Vdc_{diff}$ is positive, indicating that the first capacitor output voltage $Vdc_1$ is greater than the second capacitor output voltage $Vdc_2$, then an increasing accumulated adjustment value Vadj_sum is provided to be subtracted from the pole voltages $Vp_a$, $Vp_b$, and $Vp_c$ (i.e., increasing relative to previous accumulated adjustment values, although not necessarily a positive value). As a result the magnitude of the pole voltages $Vp_a$, $Vp_b$, and $Vp_c$ are decreased, thereby decreasing the first capacitor output voltage $Vdc_1$ relative to the second capacitor output voltage $Vdc_2$. If the difference signal $Vdc_{diff}$ is negative, indicating that the second capacitor output voltage $Vdc_2$ is greater than the first capacitor output voltage $Vdc_1$, then a decreasing accumulated adjustment value Vadj_sum is provided to be subtracted from the pole voltages $Vp_a$, $Vp_b$, and $Vp_c$ (i.e., again, decreasing relative to previous accumulated adjustment values, although not necessarily a negative value).

The output of blocks 234, 235, and 236 are provided to PWM calculator block 223, which supplies the PWM signals to gate driver block 222 based on the pole voltages $Vp_a$, $Vp_b$, $Vp_c$ as adjusted by the accumulated adjustment value Vadj_sum. In turn, gate driver block 222 drives the plurality of switches included within three-level rectifier 102. In other embodiments, rather than add/subtract (depending on the polarity of the accumulated adjustment value) the accumulated adjustment value to the pole voltages, the adjustment value is provided directly to PWM calculator 223 for use in calculating the PWM signals to be provided to active rectifier 102. Block 223 or the combination of blocks 222 and 223 may also be referred to as a PWM controller.

Figure 3:
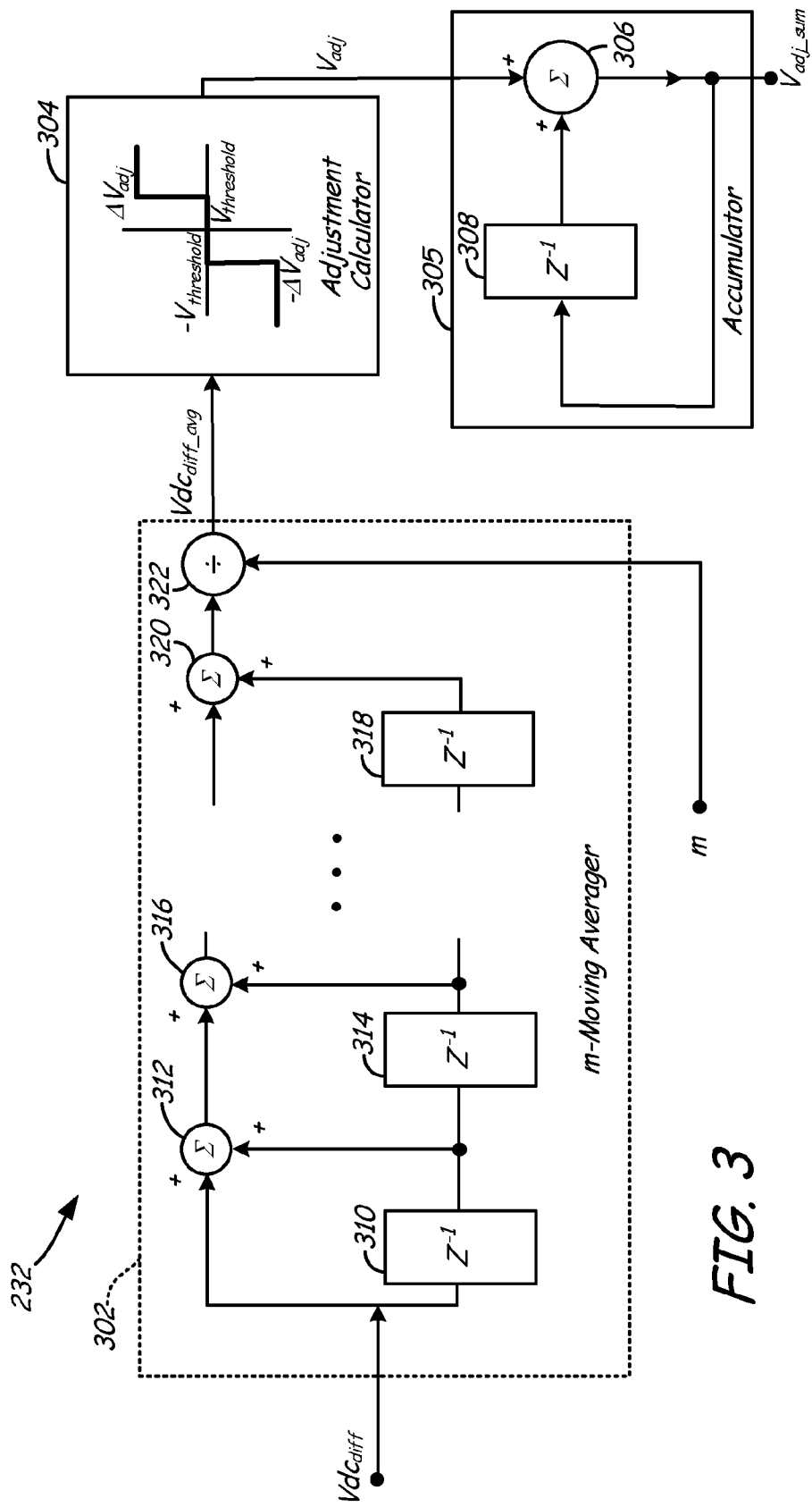
FIG. 3 is a block diagram illustrating calculation of the small increment adjustments according to an embodiment of the present invention.

FIG. 3 is a block diagram of small increment capacitor voltage balancing block 232 illustrating the calculation of the small increment adjustments according to an embodiment of the present invention. In the embodiment shown in FIG. 3, the calculated difference signal $Vdc_{diff}$ is provided as an input to m-moving average filter 302, which filters the calculated difference signal to smooth out short-term variations or transients. Successive samples of the difference signal $Vdc_{diff}$ are stored in memory cells 310, 314, . . . 318, respectively. Blocks 312, 316, . . . 320 sum the values stored in each of the memory cells to provide an accumulated sum of the difference signals $Vdc_{diff}$ over a number m of samples. The accumulated sum is divided by the number of samples m at block 322 to provide an m-moving average $Vdc_{diff\_ave}$ of the calculated difference signal $Vdc_{diff}$. The m-moving average $Vdc_{diff\_ave}$ provided by block 302 is one example of time-averaged filtering that may be employed to smooth the calculated difference signal $Vdc_{diff}$ and reduce the effect of transients on the accumulated adjustment value Vadj_sum. In other embodiments, other types of filters may be employed depending on the application. In one embodiment, the sample size of the m-moving average filter is selected based on the number of samples collected during one cycle of the three-phase input voltage. For example, in the frequency of the three-phase input voltage is approximately 400 Hz, and the sampling frequency is approximately 50 kHz, then the sample size m would be equal to approximately 125.

Adjustment calculator 304 calculates an adjustment value based on the calculated difference between the first output capacitor voltage and the second output capacitor voltage as provided by the m-moving filter 302 (i.e., determines whether or not to modify the accumulated adjustment value Vadj_sum). Adjustment calculator 304 indicates visually the criteria used to select the increment value. If the average difference signal $Vdc_{diff\_avg}$ is greater than a positive threshold value Vthreshold, then a positive increment is selected for addition to the accumulated adjustment value Vadj_sum by accumulator 305. If the average difference signal $Vdc_{diff\_avg}$ is less than a negative threshold value Vthreshold, then a negative increment is selected for addition to the accumulated adjustment value Vadj_sum by accumulator 305 (i.e., an increment value is subtracted from the accumulated adjustment value). If the average difference value $Vdc_{diff\_avg}$ is between the positive threshold value and the negative threshold value, then no increment value is provided for addition/subtraction.

The magnitude of the increment value $V_{adj}$ is selected to maintain the adjustment sum value fixed as much as possible, while balancing the capacitor output voltages in a timely fashion. The smaller the value of the increment value $V_{adj}$, the longer it will take to balance the capacitor output voltages. However, the larger the increment value $V_{adj}$, the greater fluctuations in the accumulated adjustment value $V_{adj\_sum}$.

In other embodiments, rather than a single increment value (either positive or negative), a plurality of increment values may be provided of varying magnitudes with respect to different threshold values (i.e., increasing increment values with increasing threshold values).

The accumulator 305 accumulates calculated adjustment values to generate an accumulated adjustment value Vadj_sum. In the embodiment shown in FIG. 3, the accumulator 305 includes a summer block 306 and a memory cell 308. Memory cell 308 stores the accumulated adjustment value Vadj_sum, which is continuously modified by subsequent calculations of increment values Vadj. Summer block 306 adds the stored adjustment sum value to the small increment value provided by adjustment block 304 to generate an accumulated adjustment value Vadj_sum.

In this way, imbalances detected by the comparison of capacitor output voltages $Vdc_1$, $Vdc_2$ as represented by a difference signal $Vdc_{diff}$ is used as feedback to modify the control signal outputs (i.e., in this case, calculated pole voltages $Vp_a$, $Vp_b$, $Vp_c$) to balance the output capacitor voltages $Vdc_1$, $Vdc_2$. In particular, the adjustment calculator 304 selects an adjustment value Vadj based on calculated average difference signal $Vdc_{diff\_avg}$ and the accumulator block 305 accumulates the selected adjustment values to generate an accumulated adjustment value Vadj_sum, which is combined with the control signals generated by the DC output regulation portion 200 (shown in FIG. 2) to balance the output capacitor voltages $Vdc_1$, $Vdc_2$.

A benefit of balancing the capacitor output voltages $Vdc_1$, $Vdc_2$ is that equal loading and stress is provided across capacitors $C_1$ and $C_2$. In addition, balancing of the capacitor output voltages using the small increment capacitor voltage algorithm reduces the $4^{th}$ harmonic components of the input 3-phase AC currents which may be desired when designing the active rectifier.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. An active rectification system comprising:
    an active rectifier that converts an alternating current (AC) input to a direct current (DC) output, the active rectifier including a plurality of switching devices and a first output capacitor and a second output capacitor; and
    a controller having a DC output regulation portion that monitors the DC output and in response generates control signals for regulating the DC output to a desired value, and an output capacitor balancing portion that monitors first and second output capacitor voltages associated with the first and second output capacitors, respectively, and generates an accumulated adjustment value that modifies the control signals provided by the DC output regulation portion to balance the first and second output capacitor voltages.

2. The system of claim 1, wherein the output capacitor balancing portion calculates a difference signal based on a comparison of the first output capacitor voltage to the second output capacitor voltage.

3. The system of claim 2, wherein the output capacitor balancing portion includes a filter for removing transients associated with the calculated difference signal.

4. The system of claim 2, wherein the output capacitor balancing portion selects an adjustment value based on the calculated difference signal.

5. The system of claim 4, wherein the adjustment value is combined with an accumulated adjustment value to generate a current accumulated adjustment value.

6. The system of claim 1, wherein the controller further includes:
    a pulse width modulation (PWM) calculator that calculates PWM signals used to drive the plurality of switching devices based on the control signals provided by the DC output regulation portion as modified by the accumulated adjustment signal.

7. The system of claim 6, wherein the control signals are pole voltage values calculated by the DC output regulation portion.

8. The system of claim 7, wherein the accumulated adjustment signal is added to the pole voltage values.

9. A method of regulating an active rectifier to a desired DC output voltage while balancing first and second output capacitor voltages of the active rectifier, the method comprising:
    monitoring a first output capacitor voltage and a second output capacitor voltage, a sum of the first output capacitor voltage and the second output capacitor voltage representing the DC output voltage of the active rectifier;
    calculating control signals based on the monitored first and second output capacitor voltages to regulate the DC output voltage to a desired value;
    detecting an imbalance in the monitored first and second output capacitor voltages;
    calculating an accumulated adjustment value based on detected imbalances in the monitored first and second output capacitor voltages;
    applying the accumulated adjustment value to the calculated control signals; and
    generating drive signals supplied to switching devices within the active rectifier based on the control signals as modified by the accumulated adjustment value.

10. The method of claim 9, wherein detecting the imbalance in the monitored first and second output capacitor voltages includes calculating a difference between the monitored first and second output capacitor voltages.

11. The method of claim 9, wherein calculating the accumulated adjustment value based on detected imbalances in the monitored first and second output capacitor voltages includes:
    applying a filter to the detected imbalances in the monitored first and second output capacitor voltages.

12. The method of claim 11, wherein applying the filter to the detected imbalances includes applying a moving average filter to the detected imbalances.

13. The method of claim 9, wherein calculating the accumulated adjustment value based on detected imbalances in the monitored first and second output capacitor voltages includes:
    selecting an adjustment value based on a magnitude of the detected imbalance in the first and second output capacitor voltages; and
    adjusting the accumulated adjustment value based on the selected adjustment value.

14. A controller for regulating a multi-level active rectifier that converts an alternating current (AC) input to a direct current (DC) output, the controller comprising:
    a DC output regulation portion that monitors the DC output and generates control signals for regulating the DC output to a desired value; and
    an output capacitor balancing portion that monitors first and second output capacitor voltages associated with at least first and second output capacitors connected at the DC output of the multi-level active rectifier, respectively and generates an accumulated adjustment value that modifies the control signals provided by the DC output regulation portion to balance the first and second output capacitor voltages.

15. The controller of claim 14, wherein the output capacitor balancing portion includes:
a difference calculator that calculates a difference between the first output capacitor voltage and the second output capacitor voltage;
an adjustment calculator that calculates an adjustment value based on the calculated difference between the first output capacitor voltage and the second output capacitor voltage; and
an accumulator that accumulates the calculated adjustment values by summing a previous accumulated adjustment value with the calculated adjustment value.

16. The controller of claim 15, wherein the adjustment calculator calculates an adjustment value by selecting a positive adjustment value if the calculated difference is greater than a first threshold value and selecting a negative adjustment if the calculated difference is less than a second threshold value.

17. The controller of claim 15, wherein the adjustment calculator calculates an adjustment value by selecting one of a plurality of positive adjustment values based on the calculated difference being greater than one or more of a plurality of positive thresholds and one of a plurality of negative adjustment values based on the calculated difference being less than one or more of a plurality of negative thresholds.

18. The controller of claim 14, further including:
a pulse width modulation (PWM) controller that generates PWM signals used to control the state of a plurality of switching devices included in the multi-level active rectifier based on the control signals generated by the DC output regulation portion as modified by the accumulated adjustment value.

* * * * *